March 6, 1962 J. DAGUET 3,024,312

SINGLE-SIDEBAND EQUIPMENT FOR THE TRANSMISSION OF SPEECH SIGNALS

Filed July 7, 1958

INVENTOR
*JACQUES DAGUET*

BY Frank R. Jifani
AGENT 3,024,312

SINGLE-SIDEBAND EQUIPMENT FOR THE TRANSMISSION OF SPEECH SIGNALS

Jacques Daguet, Paris, France, assignor to North American Philips Company, Inc., New York, N.Y., a corporation of Delaware Filed July 7, 1958, Ser. No. 746,721
Claims priority, application France July 12, 1957
8 Claims. (Cl. 179—15)

Figure 1:
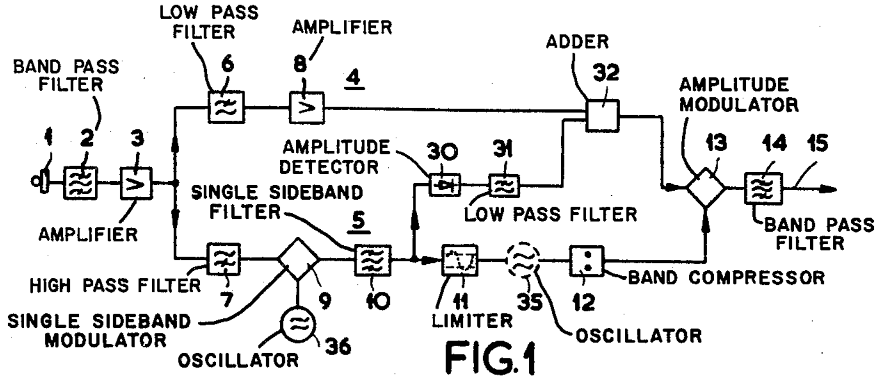

This invention relates to single-sideband equipment for the transmission of speech signals comprising a transmitter including a band compression arrangement and a receiver including a band expansion arrangement, in which single-sideband equipment at the transmitter end the band compression arrangement comprises a number of parallel-connected channels, of which a first channel faithfully passes a lower speech-frequency sub-band and a second channel is provided with a band compressor which is fed by a single-sideband signal corresponding to an upper speech-frequency sub-band, whilst at the receiver end the band expansion arrangement comprises a corresponding number of parallel-connected channels, of which a first receiver channel faithfully passes the lower speech-frequency sub-band and a second receiver channel is provided with a band expander for recovering the single-sideband signal corresponding to the upper speech-frequency sub-band.

For the transmission of the various parallel-connected transmitter channels it has already been suggested to change the frequency of the signal in the first transmitter channel by means of suitable frequency conversion to a frequency adjacent the signals of the remaining transmitter channels and to transmit these channels to the receiver as one frequency band, whilst at the receiver end the transmitted signals are supplied through selecting filters to the parallel-connected receiver channels, the signals in the first receiver channel being shifted by suitable frequency conversion to frequencies suitably situated with respect to the output signals in the remaining receiver channels, the original speech signal being subsequently recovered by single-sideband demodulation. With a band compression factor of from 3 to 4 a satisfactory transmission quality was obtained.

It is an object of the present invention to simplify the single-sideband equipment materially by utilizing the properties of a speech signal, whilst in addition the occurrence of interference tones is reduced.

According to the invention, the output ends of the two transmitter channels are connected to an amplitude modulator with an associated output filter, in which amplitude modulator the single-sideband signal derived from the band compressor in the second transmitter channel is amplitude-modulated by the signal in the first transmitter channel which is situated in the lower audio-frequency band, whilst at the receiver end the received single-sideband signal is supplied in parallel connection to an amplitude detector and a voltage limiter, the amplitude detector being connected to the input of the first and the voltage limiter to the input of the second receiver channel, whilst in order to recover the original speech signal the output voltage of the band expander in the second receiver channel is added, through a single-sideband demodulator, to the output voltage of the amplitude detector in the first receiver channel.

In order to improve the transmitter efficiency and the transmission quality, in a preferred embodiment an envelope detector comprising an amplitude detector and a low-pass filter is connected to the second transmitter channel in order to obtain the envelope signal of the upper speech-frequency sub-band, this envelope signal being supplied together with the signals in the lower speech-frequency sub-band as a modulating voltage to the amplitude modulator, whilst at the receiver end the envelope signal is taken from the output of the amplitude detector and, through a low-pass filter, controls an amplitude modulator connected in cascade with the band expander in the second receiver channel.

Figure 2:
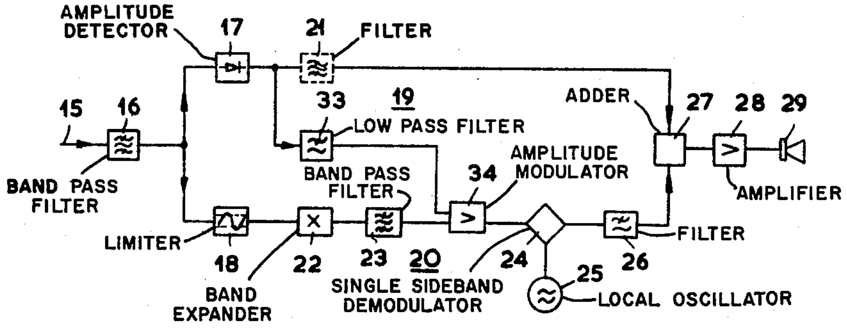

In order that the invention may readily be carried out, an embodiment thereof will now be described more fully with reference to the accompanying diagrammatic drawings, in which FIGS. 1 and 2 show a transmitter and a receiver respectively of the kind used in single-sideband equipment in accordance with the invention.

In the transmitter shown in FIG. 1, the signals taken from a microphone 1 are supplied, through a filter 2 which passes the speech signals between 0.1 kc./s. and 3.5 kc./s., after amplification in an amplifier 3, to the parallel-combination of two channels 4 and 5 having input filters 6 and 7 respectively, the input filter 6 passing the signals in the lower speech-frequency sub-band of, for example, from 0.1 to 0.5 kc./s. and the input filter 7 passing the signals in the upper speech-frequency sub-band of, for example, from 0.5 to 3.5 kc./s.

The channel 4 faithfully passes the signals in the lower speech-frequency sub-band of from 0.1 to 0.5 kc./s. and is provided with a low-frequency amplifier 8, whilst the channel 5 comprises the cascade connection of a single-sideband modulator 9, a single-sideband filter 10, a limiter 11 and a band compressor 12.

To the single-sideband modulator 9 there is connected an oscillator 36 having a frequency of 95 kc./s. for amplitude-modulation of the speech frequencies in the upper speech-frequency sub-band of from 0.5 to 3.5 kc./s., the single-sideband filter 10 passing the upper sideband situated in the frequency band of from 95.5 to 98.5 kc./s. This single-sideband signal of from 95.5 to 98.5 kc./s. is supplied, after limiting in the limiter 11, to the band compressor 12 comprising a frequency divider, a signal in the frequency band of from 9.55 to 9.85 kc./s. being obtained by frequency division using a dividing factor of 10. The frequency divider may be designed in a variety of manners, for example of the type described in detail in French patent specification 1,126,916.

Using the property of speech signals that the occurrence of a signal in the lower speech-frequency sub-band of from 0.1 to 0.5 kc./s. always is associated with a signal in the upper speech-frequency sub-band of from 0.5 to 3.5 kc./s., the transmission of the signals in the channels 4 and 5 is effected in simple manner by connecting these channels to an amplitude modulator 13. Every time a signal occurs in the lower speech sub-band there also appears at the output of the frequency divider a single-sideband signal situated in the frequency band of from 9.55 to 9.85 kc./s., which is amplitude-modulated by the signal in the lower audio-frequency band of from 0.1 to 0.5 kc./s. of channel 4, so that at the output of the amplitude modulator 13 there is produced an amplitude-modulated single-sideband signal situated in the frequency band of from 9.05 to 10.35 kc./s., which is supplied to an output lead 15 through an output filter 14. There is no need for both sidebands of the amplitude-modulated signal to be always transmitted, but it suffices to transmit only one of these sidebands, use being made, for example, of an output filter 14 having a pass-band of from 9.0 to 10.0 kc./s.

The output signal supplied to the line 15 has a bandwidth of about 1 kc./s. so that compared with the original speech signal (3.4 kc./s.) a considerable saving in bandwidth is obtained whilst in addition between the output signal of the channel 5 situated in the frequency band of from 9.55 to 9.87 kc./s. and the edges of the output filter 14 there is a sufficient frequency spacing to prevent undesirable phase shifts in this signal which have been found to be substantially responsible for interference tones.

FIG. 2 shows the receiver co-operating with a transmitter according to FIG. 1.

The received amplitude-modulated single-sideband signal from the line 15 is supplied, through a bandpass filter 16, in parallel connection to an amplitude detector 17 and a voltage limiter 18, so that by amplitude detection the signals in the lower speech-frequency sub-band of from 0.1 to 0.5 kc./s. and by voltage limitation the single-sideband signal in the band of from 9.55 to 9.85 kc./s., which corresponds to the upper speech-frequency sub-band, are obtained and supplied for further manipulation to receiver channels 19 and 20 respectively.

The channel 19 can be provided with a filter 21 which only passes the lower speech sub-band of from 0.1 to 0.5 kc./s., whilst the channel 20 comprises the cascade connection of a band expander 22, an output band-pass filter 23, a single-sideband demodulator 24 with an associated local oscillator 25 and a usual output filter 26.

As the band expander 22 use is made of a frequency multiplier stage which can be designed in a variety of manners, for example as described in the French patent specification 1,126,916 mentioned hereinbefore.

In the embodiment shown there is produced, by frequency multiplication by a factor 10 in the frequency multiplier 22, from the single-sideband signal taken from the output of the voltage limiter 18 and having a constant amplitude of from 9.55 to 9.85 kc./s. a single-sideband signal in the original frequency band of from 95.5 to 98.5 kc./s. which for demodulation is supplied, through a bandpass filter 23 having a pass-band of from 95.95 to 98.5 kc./s., to a single-sideband demodulator 24 associated with a local oscillator 25 of frequency 95.5 kc./s. At an output filter 26 of the single-sideband demodulator 24 the audio-frequency signal in the upper frequency sub-band of from 0.5 to 3.5 kc./s. is produced and, in order to recover the original speech signal, this signal is added in an addition device 27 to the signal in the lower speech-frequency sub-band of from 0.1 to 0.5 kc./s. taken from the channel 19, the two signals being supplied together through a low-frequency amplifier 28 to a reproducing arrangement 29.

In the transmission equipment described, which is characterized by a simple transmission of the signals of the parallel-connected transmitter channels 4 and 5 and by a simple selection of these signals at the receiver end, with a band compression factor of about 3 to 4 a satisfactory transmission quality is obtained, and particularly the intelligibility of the transmitted speech and the recognizability of the voices can be considered excellent.

In order further to improve the described single-sideband equipment, in the transmitter shown in FIG. 1 there is connected to the output of the single-sideband filter 10 an envelope detector comprising an amplitude detector 30 and a low-pass filter 31 having a cut-off frequency lower than, for example, 80 c./s., the envelope signal taken from the low-pass filter 31 being added in an addition device 32 to the signals in the lower speech-frequency sub-band of from 0.1 to 0.5 kc./s. in order to provide amplitude modulation of the output signal of the frequency divider 12 in the amplitude modulator stage 13.

In the arrangement described, the unipolar enveloping signal provides a variation of the amplitude of the output oscillations of the amplitude modulator 13, for example at a great strength of the envelope signal the amplitude of the output oscillations of the amplitude modulator 13 will show a large value, whilst conversely at a low strength of the envelope signal the amplitude of the output oscillations of the amplitude modulator 13 has a low value. The advantage of this arrangement consists in that the efficiency of the transmitter is improved, since as was found the strength of the envelope signal follows the level of the signals in the lower speech-frequency sub-band of from 0.1 to 0.5 kc./s. If namely the level of the signals in the lower speech-frequency sub-band of from 0.1 to 0.5 kc./s. has a high value, the strength of the envelope signal will have a corresponding high value and the amplitude of the output oscillations of the amplitude modulator 13 will have a value sufficient to handle high-strength signals in the lower speech-frequency sub-band, whilst conversely at a low level of the signals in the lower speech-frequency sub-band of from 0.1 to 0.5 kc./s. the amplitude of the output oscillations of the amplitude modulator 13 has a corresponding low value. Thus the amplitude of the output oscillations of the amplitude modulator stage 13 is adapted to the level of the signals in the lower speech-frequency sub-band without risk of overmodulation, and this means an improvement in efficiency.

At the receiver end, the envelope of the signals in the upper speech sub-band of from 0.5 to 3.5 kc./s. is recovered with the aid of a low-pass filter 33 having a cut-off frequency of 80 c./s. which is connected to the output of the amplitude detector 17, and this envelope is used for gain control of the signals in the channel 20. In the embodiment described, the envelope signal for this purpose controls an amplifier 34 which is connected between the bandpass filter 23 and the single-sideband demodulator 24 and is designed as an amplitude modulator, so that the audio-frequency signals between 0.5 and 3.5 kc./s. taken from the single-sideband demodulator 24 are produced in the channel with the correct gain ratio with respect to the signals in the lower frequency sub-band of from 0.1 to 0.5 kc./s., with the result that the transmission quality is improved.

Thus this step provides an improvement of the efficiency and an improvement of the transmission quality without increase in the band-width required for transmission.

It should be noted here that in the equipment hitherto described, in order to improve the frequency division of the comparatively wide frequency band of from 95.5 to 98.5 kc./s., it is of advantage to include an oscillator 35 having a frequency of 97 kc./s. situated centrally of the frequency band to be divided, between the limiter 11 and the frequency divider 12, this oscillator 35 being synchronized by the single-sideband signal taken from the limiter, for this ensures that when a speech signal occurs, the frequency divider 12 adjusts itself to the required value more rapidly.

What is claimed is:

1. A system for the transmission of signals comprising means separating said signals into first and second frequency bands, means applying said separated signals to first and second signal channels, respectively, said second channel comprising a source of electrical oscillations, means for modulating said oscillations with signals of said second band to provide a single sideband signal, and means compressing the band of said single sideband signal, and means amplitude modulating said compressed single sideband signal with the signal output of said first signal channel.

2. A system for the single sideband transmission of signals having a predetermined bandwidth comprising means separating said signals into first and second frequency bands, means applying said separated signals to first and second signal channels, respectively, said first channel being arranged to pass signals of said first band, said second channel comprising a source of electrical oscillations, means for modulating said oscillations with signals of said second band to provide a single sideband signal, and means compressing the frequency band of said single sideband signal, means for amplitude modulating the said compressed single sideband signal with the signal output of said first signal channel to provide an amplitude modulated single sideband output signal.

3. The system of claim 2 in which means are provided to apply said amplitude modulated output signal to output filter means to reject one of the sidebands of said amplitude modulated output signal.

4. In the system of claim 2, means for receiving said amplitude modulated output signals comprising means applying said amplitude modulated output signal to amplitude detector means and voltage limiter means, means for expanding the frequency band of the output of said limiter means, single sideband demodulator means for demodulating the output of said expanding means, and means for adding the outputs of said amplitude detector means and demodulator means.

5. A single sideband system for the transmission of speech signals comprising transmitter means and receiver means, said transmitter means comprising means separating said speech signals into first and second frequency bands, a source of electrical oscillations, means modulating said oscillations with signals of said second band to provide a first single sideband signal, means compressing the frequency band of said single sideband signal, and means amplitude modulating said compressed single sideband signal with signals of said first frequency band to provide an amplitude modulated single sideband output signal, said receiver means comprising means applying said amplitude modulated single sideband output signal to amplitude detector means and voltage limiting means, means for expanding the frequency band of the output of said limiting means, single sideband demodulator means for demodulating the output of said expanding means, and means for adding the outputs of said amplitude detector means and demodulator means.

6. The system of claim 5 in which said first frequency band includes speech signal frequencies up to about 0.5 kilocycle, and said second frequency band includes speech signals above about 0.5 kilocycle.

7. The system of claim 5 in which said transmitter means includes means applying said first single sideband signal to envelope detector means comprising an amplitude detector and a first low-pass filter, and means adding the output of said envelope detector to signals of said first frequency band prior to modulation of said compressed single sideband signals with said signals of said first band, and said receiver means includes second low-pass filter means connected to the output of said amplitude detector means, amplitude modulating means connected between said expanding means and demodulator means, and means connecting said second low-pass filter to said amplitude modulating means to modulate the output of said band expanding means prior to application of said last-mentioned output to said demodulator means.

8. The system of claim 7 in which the cutoff frequency of said first and second low-pass filters is less than about 80 cycles per second.

References Cited in the file of this patent

UNITED STATES PATENTS

| | | |
|---|---|---|
| 1,685,357 | Griggs | Sept. 25, 1928 |
| 2,629,010 | Graham | Feb. 17, 1953 |
| 2,686,831 | Dome | Aug. 17, 1954 |
| 2,725,425 | Sziklai | Nov. 29, 1955 |